Patented July 5, 1949

2,475,286

UNITED STATES PATENT OFFICE 2,475,286

METHOD OF PREPARING CHLORINE DIOXIDE

Willis S. Hutchinson, St. Paul, Minn., assignor to Mathieson Chemical Corporation, a corporation of Virginia No Drawing. Application July 12, 1944, Serial No. 544,647

5 Claims. (Cl. 204—164)

This invention relates to the generation of chlorine dioxide and more particularly to an improved process whereby chlorine dioxide, free from elemental chlorine and in safe concentrations, may be economically produced in constant and readily controlled quantities.

Chlorine dioxide has many uses in the industry. For instance, its use has heretofore been proposed in the bleaching of flour. However, because of its unstable character, chlorine dioxide cannot be produced in bulk and stored until needed. Consequently, it is necessary to generate the chlorine dioxide at the place where it is to be used and only in immediately-required quantities.

A further difficulty heretofore experienced has been the necessity of maintaining the chlorine dioxide at a safe concentration throughout the generating and processing operation. It is generally necessary, in order to avoid explosion hazards, to handle chlorine dioxide in a rather high state of dilution with air or some other inert gaseous medium. The handling of chlorine dioxide in concentrations such that the partial pressure of the chlorine dioxide is equal to about 70 mm. of mercury or higher is usually unsafe. For commercial purposes, for instance in the treatment of flour, the partial pressure of the chlorine dioxide in such chlorine dioxide-air mixtures should not usually exceed about 30 mm. and preferably should be considerably lower. Thus the adjustment and control of the rate of generation and the concentration of chlorine dioxide in the resultant mixture, so as to avoid hazardous concentrations at any point in the apparatus, is of major importance.

Various reactions are known whereby chlorine dioxide may be generated for instance, it has heretofore been recognized that chlorine dioxide may be generated by reacting hydrochloric acid, with a chlorate, for instance potassium chlorate. The use of other chlorine-containing salts has also been proposed in the generation of chlorine dioxide, but the chlorates have the advantage of ready availability and relative cheapness. However, the use of chlorate for this purpose has been subject to the disadvantage that the resultant chlorine dioxide has been contaminated with elemental chlorine.

The reaction of potassium chlorate, for instance, with hydrochloric acid may be represented, generally, by the following equation:

$$2KClO_3 + 4HCl \rightarrow 2ClO_2 + Cl_2 + 2H_2O + 2KCl$$

Thus it will be seen that for each two moles of chlorine dioxide formed, 1 mole of elemental chlorine is liberated. Further, additional chlorine is consumed in the formation of 2 moles of potassium chloride.

In accordance with my present invention, I utilize a chlorate, potassium chlorate for instance, as the sole chlorine-containing reactant, and all of the chlorine of the chlorate consumed by the reaction is converted to chlorine dioxide, thus avoiding the loss of chlorine in an unwanted by-product of the reaction. A further advantage of my invention is that I thereby obtain chlorine dioxide uncontaminated by elemental chlorine. A still further advantage is that the chlorine dioxide is readily produced in safe concentrations, while avoiding the necessity of tedious measurements and control of corrosive acids, such as hydrochloric acid.

My present invention is based upon my discovery that if nitrogen peroxide diluted with air or other inert gas be brought into contact with an alkali metal chlorate, $KClO_3$ for instance, the nitrogen peroxide of the mixture will react with the chlorate to form chlorine dioxide and the nitrate of the metal. The chlorine dioxide as formed is diluted with the diluent gas present in the nitrogen peroxide mixture and, by using sufficiently diluted mixtures of the nitrogen peroxide, safe concentrations of chlorine dioxide are obtained.

Although I cannot definitely state the exact course of the reaction, it appears to be represented, generally, by the following equation:

$$NO_2 + KClO_3 \rightarrow ClO_2 + KNO_3$$

Thus, for each mole of chlorate consumed, 1 mole of chlorine dioxide is formed and no elemental chlorine is liberated to contaminate the chlorine dioxide. Further, an equal molar proportion of potassium nitrate is formed, which constitutes a valuable by-product of the process.

The concentration of a chlorine dioxide-air mixture, such as previously described, in which the partial pressure of the chlorine dioxide is 70 mm. of mercury, is about 10 mole per cent, and that in which the partial pressure of the chlorine dioxide is 30 mm. is about 4 mole per cent. Consequently, assuming complete reaction of the nitrogen peroxide with the chlorate, chlorine dioxide mixtures in which the partial pressure of the chlorine dioxide is as just indicated may be prepared by passing in contact with the chlorate mixtures of nitrogen peroxide and air, in which the concentration of the nitrogen peroxide is about 10 mole per cent and about 4 mole per cent, respectively.

The invention has been found particularly applicable to the bleaching of flour or the like, but it will be understood that its application is not so limited.

Nitrogen peroxide has been extensively used in the bleaching of flour and the like, and a convenient and economical source of nitrogen peroxide for such purposes has been generators of the type in which excess air is passed through a disruptive electrical discharge. In passing through the field of the electrical discharge, a portion of the oxygen and nitrogen of the air is converted to nitrogen peroxide, or perhaps to NO which is subsequently oxidized to nitrogen peroxide by the excess air. A large portion of the air, however, passes through the generator unchanged, and the resultant gas is a mixture consisting primarily of nitrogen peroxide and possibly other oxides of nitrogen, diluted with a substantial proportion of air. By such treatment, the maximum concentration of nitrogen peroxide (calculated as $NO_2$) in the resultant gases is about 1 to 2%.

A satisfactory generator of this type is the apparatus known to the industry as the Alsop generator. As these nitrogen oxide generators have been used extensively in the industry, they are generally available for purposes of my present invention. Further, they are a convenient and economical source of dilute nitrogen peroxide gaseous mixtures.

In accordance with my present invention nitrogen peroxide in admixture with an inert diluent gas, advantageously the nitrogen peroxide air mixture from a generator such as an Alsop generator, is brought in contact with the solid chlorate, for instance, in crystalline or granular form. Advantageously the gas mixture is passed through a bed or column of particles of the chlorate. The amount and concentration of the nitrogen peroxide mixture may be controlled within limits by regulating the rate of operation of the generator, but the nitrogen peroxide concentration cannot exceed safe operating limits. The bed or column of chlorate through which the gas mixture is passed is with advantage of sufficient depth to afford adequate contact to permit substantially complete reaction of the nitrogen peroxide present with the chlorate. Mixtures of nitrogen peroxide, $ClO_2$ and air may be produced if desired by providing insufficient contact for complete reaction.

The operation is simple, safe, economical and readily controlled. The concentration of the resultant chlorine dioxide gas cannot exceed the concentration of the nitrogen peroxide in the reacting mixture (calculated as $NO_2$), as each mole of chlorine dioxide formed requires one mole of $NO_2$. Therefore, since nitrogen oxide generators of the type described, particularly generators of the Alsop type, are incapable of producing nitrogen peroxide at high partial pressures, the danger of producing chlorine dioxide mixtures of dangerous concentrations is avoided.

Though nitrogen peroxide has been found to be an effective bleaching agent for flour and the like, the effectiveness of an equimolar proportion of chlorine dioxide, based on nitrogen peroxide as $NO_2$, has been found to be much greater. For example a partially bleached flour, containing 1.36 parts per million of "carotene" was treated with 1.2 grams of nitrogen peroxide per barrel of flour and the "carotene" content was thereby reduced to 0.86 part per million. The product was a dull, creamy color having a Slick score color number of 8. In a further test, the same amount of nitrogen peroxide diluted with air was first passed through a column of potassium chlorate ½ inch in diameter and 8 inches long and the resultant gas, consisting primarily of chlorine dioxide and air was used in the treatment of a like quantity of the same flour. The flour after this treatment was found to have a "carotene" content of 0.75 part per million and was a good white color having a Slick score color number of 10.

The invention may be used with particular advantage in the production of chlorine dioxide mixtures of low concentrations, of the order described as safe for commercial purposes. However, by the use of more concentrated nitrogen peroxide mixtures, more concentrated mixtures of chlorine dioxide may be produced where desirable.

I claim:

1. A process for the production of chlorine dioxide in a state of dilution with an inert diluent gas which comprises reacting gaseous nitrogen peroxide, diluted with said diluent gas to a concentration not greater than about 10 mole per cent, with a chlorate of an alkali metal.

2. A process for the production of chlorine dioxide in a state of dilution with air which comprises passing air through the field of a disruptive electrical discharge and passing the resulting gaseous mixture, comprising a substantial proportion of nitrogen peroxide, in contact with a chlorate of an alkali metal.

3. A process for the production of chlorine dioxide in a state of dilution with air which comprises passing an admixture of nitrogen peroxide diluted with air to a concentration not greater than about 10 mole per cent. in contact with a chlorate of an alkali metal.

4. A process for the production of chlorine dioxide in a state of dilution with air which comprises passing an admixture of nitrogen peroxide diluted with air to a concentration not greater than about 4 mole per cent. in contact with a chlorate of an alkali metal.

5. A process for generating chlorine dioxide in controlled concentration in admixture with an inert diluent gas which comprises introducing a gaseous charge comprising nitrogen peroxide diluted with said diluent gas into a reaction zone, and producing the chlorine dioxide in admixture with said diluent gas by reacting the nitrogen peroxide in said zone with an alkali metal chlorate whereby the nitrogen peroxide is converted on an equimolar basis to chlorine dioxide in admixture with said diluent gas, the molar concentration of the nitrogen peroxide in said gaseous charge to the reaction zone not exceeding about 10 mole percent.

WILLIS S. HUTCHINSON.

REFERENCES CITED

The following references are of record in the file of this patent:

UNITED STATES PATENTS

| Number | Name | Date |
|---|---|---|
| 2,089,913 | Cunningham | Aug. 10, 1937 |
| 2,332,181 | Soule | Oct. 19, 1943 |

OTHER REFERENCES

Frankland et al, Journal of the Chemical Society (British), vol. 79 (1901), pp. 1356–1373.